C. C. BAILEY.
RESILIENT WHEEL.
APPLICATION FILED FEB. 21, 1914.
1,117,623.
Patented Nov. 17, 1914.
2 SHEETS—SHEET 1.
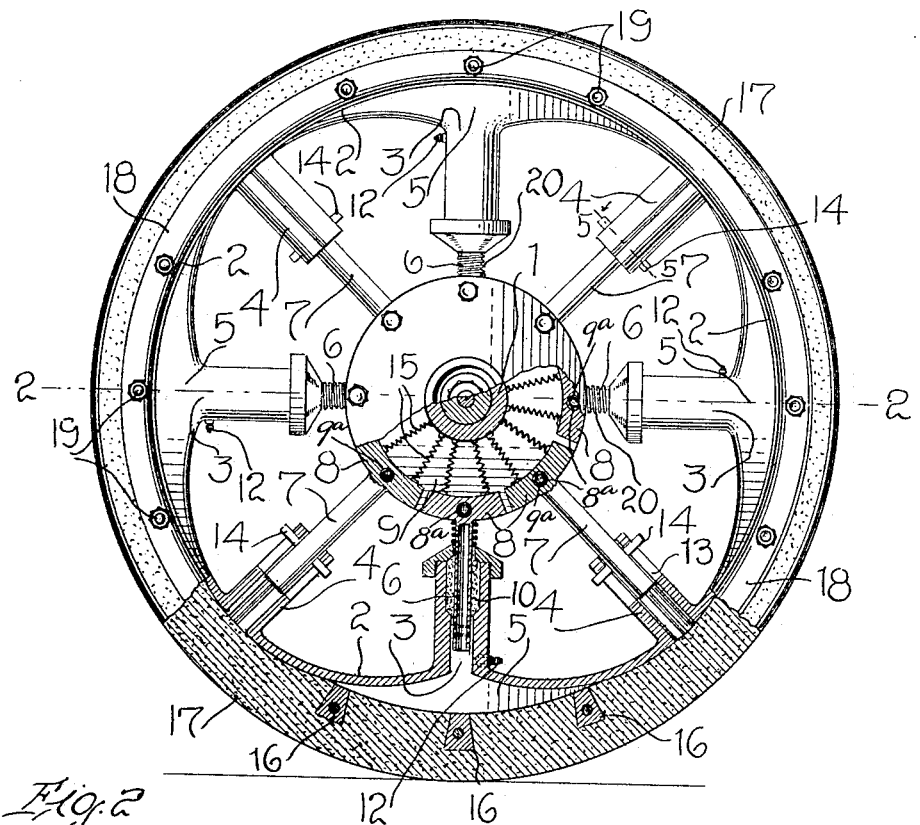
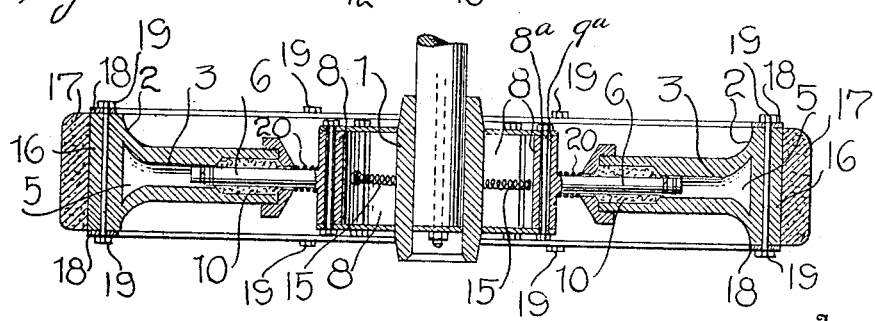
Witnesses
Robert M. Sutphen
A. J. Hind
Inventor
CARL C. BAILEY
By Watson E. Coleman
Attorney

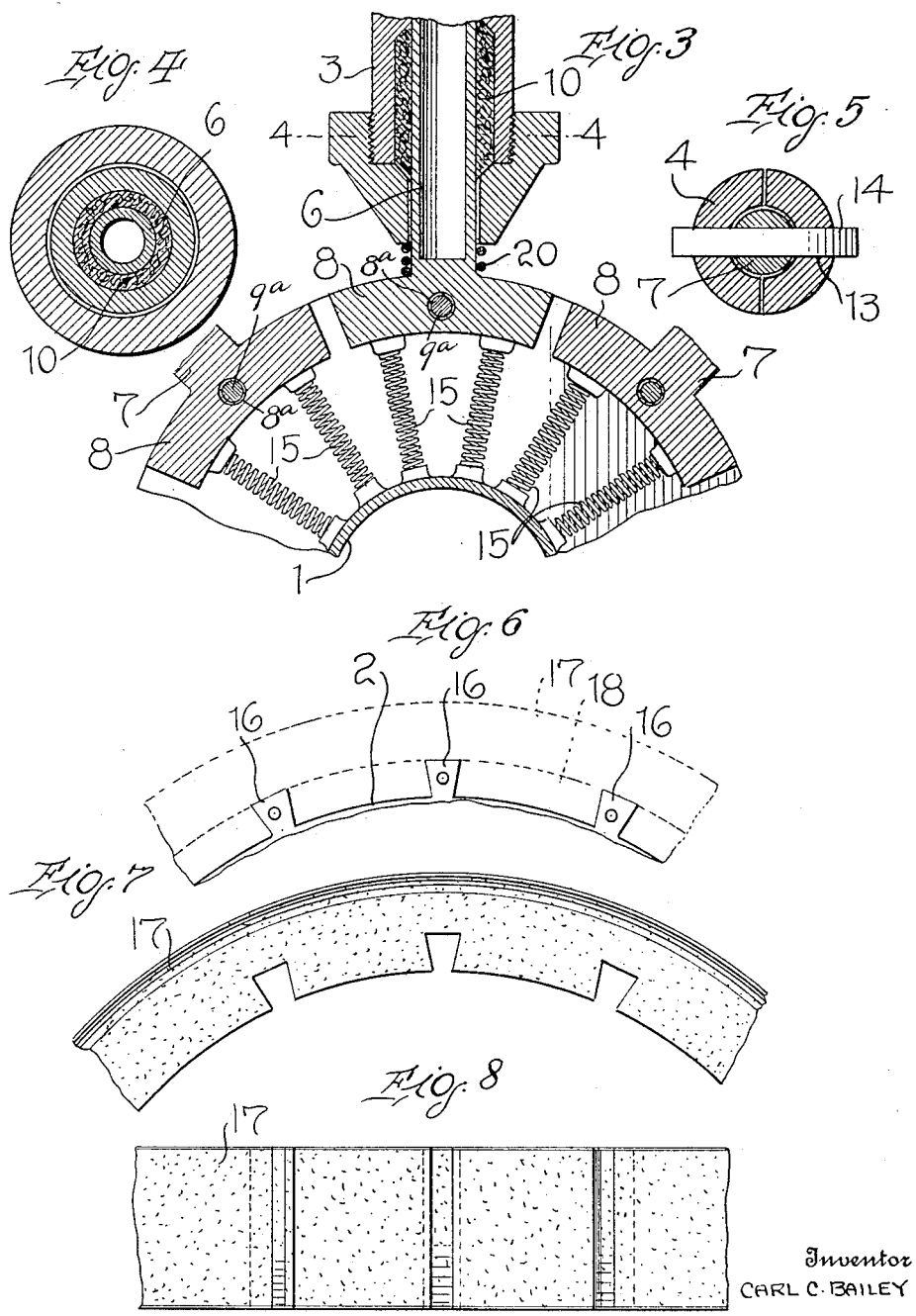

UNITED STATES PATENT OFFICE.

CARL C. BAILEY, OF BRUNSWICK, OHIO.

RESILIENT WHEEL.

1,117,623.   Specification of Letters Patent.   Patented Nov. 17, 1914.

Application filed February 21, 1914. Serial No. 820,307.

*To all whom it may concern:*

Be it known that I, CARL C. BAILEY, a citizen of the United States, residing at Brunswick, in the county of Medina and State of Ohio, have invented certain new and useful Improvements in Resilient Wheels, of which the following is a specification, reference being had to the accompanying drawings.

This invention relates to new and useful improvements in resilient wheels and the primary object of the invention is to provide a device of this character which is adapted to supersede the present wheel with the cushion pneumatic tires used on automobiles.

A further object of the invention resides in providing a resilient wheel wherein air cushioning means is provided for affording the resiliency.

Still another object of the invention resides in providing a wheel of this character which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a wheel partly in section and constructed in accordance with my invention. Fig. 2 is a transverse section through the device as seen on line 2—2, of Fig. 1. Fig. 3 is an enlarged detail longitudinal section through the device. Fig. 4 is a transverse section as seen on line 4—4, Fig. 3. Fig. 5 is a similar view as seen on line 5—5, of Fig. 1. Fig. 6 is a fragmentary side elevation of one of the rim-like sections, showing the dove-tail ribs thereon. Fig. 7 is a fragmentary side elevation of a tire used in connection with the device; and Fig. 8 is an inner plan view thereof.

In describing my invention, I shall refer to the drawings, in which similar reference characters designate corresponding parts throughout the several views and in which—

1 indicates a hub adapted to receive the axle of a vehicle and an improved spoke and rim construction is designed for coöperation therewith, whereby to form a resilient wheel with air-cushioning means. To this end, a plurality of rim-like sections 2 (preferably four in number) are provided, said rim-like sections being each designed to provide a cylinder 3 on each side of which in spaced relation thereto, is also formed a half section of an additional guide cylinder 4. These rim-like sections 2, when properly placed together, provide substantially a complete rim having a plurality of inwardly extending cylinder sections formed thereon, alternating cylinder sections being indicated as 3 and formed on inwardly extending flange portions 5 of the rim sections, whereby to provide spaces between the outer ends of said cylinders 3 and the imaginary periphery of the rim sections.

Slidably mounted in each of the cylinders 3 is a hollow spoke 6 which is designed to form a piston in said cylinder, and slidably mounted in the guide cylinders 4 are the additional spoke sections 7 which form guide spokes, said spokes 6 and 7 being of a diameter less than the bore of their respective cylinders 3 and 4. I also find it of advantage to have the spokes 7 comprising a plurality of hingedly connected sections. The inner ends of said spokes 6 and 7 have the blocks 8 formed thereon which are pivotally secured to the side plates or hub flanges 9, the openings 8ᵃ in the blocks 8, through which the pivot pins 9ᵃ are directed, being elongated. A packing 10 is provided on the inner wall of each cylinder 3 at the end thereof and a gland nut is engaged with a threaded portion of the inner end of each cylinder 3 so as to prevent any leakage of air, water or oil which is adapted to be used in connection with these cylinders.

As just stated, air, oil or water is adapted to be used in connection with the cylinders 3 and piston spokes 6 and each of said cylinders is provided with a check valve 12, whereby the fluid may be entered therein at desired times. The cylinders 4, on the other hand, are provided with longitudinal slots 13, at diametrically opposite points thereon and lateral pins or the like 14 are carried on the outer ends of the guide spokes and project through these slots, thus guiding the spokes 7 in their movement in the cylinders 4.

As stated, the spoke blocks 8 are secured to the side plates 9 and arranged between the hub 1 and said blocks 8 are the coil springs 15. A pair of coil springs is provided in connection with each block 8, sockets being provided on the hub and blocks to receive the ends of said coil springs therein. These coil springs, obviously, equalize the pressure on the hub and blocks throughout the use of the device. Formed on the outer peripheral edges of the rim-like sections 2, are the dove-tail ribs 16 which are adapted to be received in similarly shaped slots or channels in the inner periphery of a fiber tire 17. A trio of such ribs may be provided for each section, as are found desirable and applied to each side of the tire is an annulus 18, the same being secured in position by means of bolts 19, extending through the same and through the dove-tail ribs 16. The tire is thus held in position on the rim sections. I also provide coil springs 20 for encircling the piston spokes 6 between the gland nuts on the cylinders 3 and the hub blocks carrying said piston spokes. These coil springs make this portion of the device considerably more durable in action and this is particularly true in case the packing in the cylinders 3 admits of any leakage after constant use.

It is understood that in the use of the device, a certain amount of air will be first forced into the cylinders 3. As the wheel is placed in use, the weight of the vehicle will force the pistons downwardly in the respective cylinders and the pistons 6 in the cylinders 3 will force the air in said cylinders outwardly against the inner periphery of the tire, thus holding this portion of the tire in a firm, but resilient position. As the piston returns to its initial position in the cylinder, air will again be drawn therein, through the medium of the check valve 12. As the pistons 6 are moved in their respective cylinders, the guide spoke sections 7 will also be moved in their respective cylinders 4, thus retaining the parts of the device in their proper positions throughout the use of the wheel.

From the foregoing description of the construction of the device, the operation thereof will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. A resilient wheel of the class described comprising a hub, a plurality of stems radiating therefrom, a rim composed of a plurality of sections having a plurality of inwardly extending cylinder members formed thereon to slidably receive said stems therein, certain of said cylinders being designed to form air-pressure cylinders and the remaining cylinders forming guide means for the stems, a tire applied to said rim, and means for securing said tire in place on the rim and simultaneously securing the sections of the rim together.

2. A resilient wheel of the class described comprising a hub, a plurality of stems radiating therefrom, a rim composed of a plurality of sections and provided with a plurality of inwardly extending cylinders to slidably receive said stems therein, certain of the cylinders being designed to form air-pressure cylinders and the remaining cylinders forming guide means for the stems received therein, a tire applied to said rim, said air-pressure cylinders being designed to force air against the inner periphery of the tire as the wheel is rotated, and means to secure said tire in place on the rim and simultaneously secure the sections of the rim together.

3. A resilient wheel of the class described comprising a hub, a plurality of stems radiating therefrom, a rim formed of a plurality of arcuate sections and having a plurality of inwardly extending cylinder members formed thereon to slidably receive said stems therein, certain of said cylinder members being designed to form air-pressure cylinders, a plurality of ribs formed on the rim sections, a tire applied to the rim and receiving said ribs therein, and means secured to the ends of said ribs to secure the tire in place on the rim and simultaneously secure the rim sections together.

4. A resilient wheel of the class described comprising a hub, spoke blocks arranged therearound in spaced relation thereto, a plurality of stem-like spokes secured to said blocks and extending outwardly to radiate substantially from the hub, certain of said stem-like spokes being of hollow construction, a rim formed of a plurality of arcuate sections provided with a plurality of inwardly extending cylinder members, slidably receiving said stem-like spokes therein, the cylinders receiving the hollow spokes therein being designed to form air-pressure cylinders, a tire secured to said rim adapted to receive air under pressure from the air-pressure cylinders against the inner periphery of the same, and means to secure said tire to the rim and simultaneously secure the rim sections together.

In testimony whereof I hereunto affix my signature in the presence of two witnesses.

CARL C. BAILEY.

Witnesses:
 HENRY REINHARDT,
 PHILIP E. LEWIS.

Copies of this patent may be obtained for five cents each, by addressing the "Commissioner of Patents, Washington, D. C."